United States Patent
Matsuoka et al.

(10) Patent No.: US 7,988,907 B2
(45) Date of Patent: *Aug. 2, 2011

(54) METHOD FOR MANUFACTURING PRESSURE-RESISTANT CONTAINER LINER AND LIQUID CRYSTAL RESIN LINER

(75) Inventors: Seiichi Matsuoka, Tokyo (JP); Toshio Nakane, Fuji (JP)

(73) Assignees: Fuji Jukogyo Kabushiki Kaisha, Tokyo (JP); Polyplastics Co., Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/223,326

(22) PCT Filed: Jan. 22, 2007

(86) PCT No.: PCT/JP2007/050897
§ 371 (c)(1),
(2), (4) Date: Jul. 29, 2008

(87) PCT Pub. No.: WO2007/086336
PCT Pub. Date: Aug. 2, 2007

(65) Prior Publication Data
US 2009/0022918 A1    Jan. 22, 2009

(30) Foreign Application Priority Data
Jan. 30, 2006    (JP) .................. 2006-020748

(51) Int. Cl.
*B29D 22/00*    (2006.01)
*B29C 49/04*    (2006.01)
(52) U.S. Cl. ...................... 264/540; 428/36.8
(58) Field of Classification Search .......... 264/540–542, 264/514, 515
See application file for complete search history.

(56) References Cited

U.S. PATENT DOCUMENTS
7,648,748 B2 *   1/2010  Nakane et al. .............. 428/36.8
2005/0260372 A1   11/2005  Matsuoka et al.

FOREIGN PATENT DOCUMENTS
| JP | 6-238738 | | 8/1994 |
| JP | 6-306261 | | 11/1994 |
| JP | 6306261 | * | 11/1994 |
| JP | 2006-43941 | | 2/2006 |

OTHER PUBLICATIONS
U.S. Appl. No. 11/911,061, filed Oct. 9, 2007, entitled "Method For Manufacturing Pressure-Resistant Container Liner and Liquid Crystal Resin Liner".

* cited by examiner

*Primary Examiner* — Monica A Huson
(74) *Attorney, Agent, or Firm* — Smith, Gambrell & Russell

(57) ABSTRACT

A resin composition formed by blending 10 to 25 weight parts of the epoxy modified polystyrene resin (B) to 100 weight parts of the liquid crystal polyester and/or the liquid crystal polyester amide (A) and by melt-kneading the two materials, wherein the resin composition having a melt viscosity of 60 to 4000 Pa·s at a shear rate of 1000/second at a temperature which is 20° C. higher than the melting point and having a melt tension of 20 mN or more at a take-over speed of 15 m/minute, is melt within a temperature range of a melting point to the melting point +40° C., a parison P is formed by extruding it with an extrusion speed equal to or higher than 0.3 kg/minute and lower than 5 kg/minute, a pair of moldings placed so as to sandwich the parison P are closed at a predetermined mold closing pressure, and air is blown into the parison P.

6 Claims, 4 Drawing Sheets

EXTRUSION ⟶ MOLD CLOSING ⟶ BLOWING

EXTRUSION → MOLD CLOSING → BLOWING

METHOD FOR MANUFACTURING PRESSURE-RESISTANT CONTAINER LINER AND LIQUID CRYSTAL RESIN LINER

STATEMENT OF JOINT RESEARCH AGREEMENT

The invention described and claimed herein was developed under a joint research agreement between Fuji Jukogyo Kabushiki Kaisha and Polyplastics Co., Ltd.

TECHNICAL FIELD

The present invention relates to a method for manufacturing a pressure-resistant container liner and a liquid crystal resin liner.

BACKGROUND ART

Currently, a pressure-resistant container for storing and transporting pressurized gas, e.g., Compressed Natural Gas (CNG), Compressed Hydrogen Gas (CHG) or low-temperature gas has been put into practical use. Conventionally, a metal pressure-resistant container having a high strength and a superior gas barrier property has been mainly used. However, because the metal pressure-resistant container has a heavy weight, it was difficult to apply the container to a fuel tank of an automobile and that of a spacecraft, which are required to have lighter weight. Thus, a pressure-resistant container having a relatively light weight, which is formed by surrounding the outer circumference of a cylindrical liner with an outer shell made of fiber reinforced resin composite has been suggested in recent years.

As a liner constituting such a pressure-resistant container, a metal liner having a superior gas barrier property has been suggested. As shown in FIG. 3, a metal liner is generally manufactured by carrying out a deep drawing processing for a metal plate 100 to form a container 110 having an opening section and by welding a dome section 120 manufactured by another step with the opening section of this container 110.

The metal liner manufactured through the above step itself has a load resistance property having a certain level. Thus, it is possible to suppress the manufacturing cost by reducing the thickness of the composite outer shell. However, the liner is not expected to be significantly lightened. On the other hand, another technique for forming a very thin liner by performing a chemical etching for a metal liner manufactured through the above step, has been suggested. Although a liner can be expected to be significantly lightened, there was a problem that the manufacturing cost was increased.

In order to solve the problem of the metal liner, a technique for manufacturing a liner by carrying out a blow molding for thermoplastic resin, has been suggested. As shown in FIG. 4, the blow molding is that melted thermoplastic resin is extruded by an extruder 200 through a circular gap of a dice 210 to form a parison 300 (extrusion step), the parison 300 is placed between a pair of molds 220 to close the molds 220 (mold closing step), and gas is blown into the parison 300 in the closed molds to form the liner (blowing step). By adopting this blow molding, it is possible to significantly reduce time required for processing the liner and the manufacturing cost.

By the way, a liner constituting a pressure-resistant container must have a "gas barrier property". Thus, in the liner, it is required to use thermoplastic resin having a superior gas barrier property. In recent years, "liquid crystal resin" has been suggested as thermoplastic resin having a superior gas barrier property. When liquid crystal resin is compared with thermoplastic resin (high density polyethylene) which has been currently used as material for a liner for a high pressure tank, liquid crystal resin has a gas barrier property about 400000 times or more higher than that of thermoplastic resin. A current high pressure tank using a high density polyethylene liner can be practically used under condition of 200 atm of CNG. However, while it is assumed that a tank pressure will increase in the future (e.g., 700 atm) or that hydrogen or helium having a small molar weight is used as storage gas, a technique for adapting liquid crystal resin to a liner has been developed (see, Patent Publication 1 for example).

Patent Publication 1: Japanese Laid-Open Publication No. H6-238738 (page 3, FIG. 1)

DISCLOSURE OF THE INVENTION

Problem to be Solved by the Invention

However, in the liquid crystal resin, there is a problem that a tensile breaking elongation is lower than those of other thermoplastic resins. For example, while high density polyethylene which is currently used for a liner has a tensile breaking elongation of 500%, general liquid crystal resin has a tensile breaking elongation of about 2%. Thus, in order to adapt liquid crystal resin to a liner, the improvement of the tensile breaking elongation has been essential.

When a liner is formed by a blow molding in which the liquid crystal resin is used as a material, there is a problem that the liquid crystal resin has a greater "anisotropic characteristics". The "anisotropic characteristics" means characteristics in which the properties of the material are different depending on directions. Thus, when the anisotropic characteristics are greater, the material is easily broken in a direction in which a poor property is caused. A composite used for an outer package of a pressure-resistant container is generally required to have a tensile breaking elongation of about 1.5% to 2%, when carbon fibers are used as reinforced fibers. Therefore, the liner is required to have a tensile breaking elongation of "2%" at minimum. Further, a design margin in which the liner is prevented from being broken prior to the breakage of the composite, is required. Thus, a tensile breaking elongation of "3% or more" is preferably achieved in all directions in consideration with the anisotropic characteristics.

Furthermore, because the liquid crystal resin has a poor adhesiveness, when a blow molding is carried out by using the liquid crystal resin, a pinch-off section functioning as an adhesive region tends to have a defect. The existence of the defect appears as the decrease of a tensile breaking elongation of the pinch-off section. The pinch-off section is generally near the top of a dome section of a pressure-resistant container. In the part which is near the top of the dome section, when a composite is wound by a Filament Winding (FW) method to form an outer shell, the outer shell is thicker than the other parts. Thus, the amount of the occurring elongation can be smaller than those of other parts and can be suppressed to about 1% or less according to the analysis. Thus, in the pinch-off section of the liner, a tensile breaking elongation of "1% or more" is required and a tensile breaking elongation of "2% or more" is preferably achieved in consideration of the design margin.

In Patent Publication 1 described above, a technique for adding specific filling material e.g., glass fiber, mineral filling material or the like, to give a blow molding property to the liquid crystal resin, is described. When liquid crystal resin is used to form a liner, it is required that the decrease of the tensile breaking elongation of the pinch-off section (adhesive region) is prevented as described above. However, no technique that can solve the decrease of the tensile breaking elongation of the pinch-off section has been suggested.

An object of the present invention is to provide a method for manufacturing a pressure-resistant container liner, in which a liquid crystal resin pressure-resistant container liner having a superior gas barrier property can be provided in a blow molding by improving the "tensile breaking elongation" of the liquid crystal resin and by improving the "anisotropic characteristics" to give the liquid crystal resin with a favorable blow molding property.

An object of the present invention is to provide a liquid crystal resin liner manufactured by the above manufacturing method.

Means for Solving the Problem

In order to solve the above problem, the invention as claimed in claim 1 is a method for manufacturing a pressure-resistant container liner by a blow molding, comprising: a resin composition melting step of heating a blow molding liquid crystal resin composition within a temperature range from a melting point to the melting point +40° C. to melt the resin composition, the resin composition being produced by blending, melting and kneading (A) 100 weight parts of liquid crystal polyester and/or liquid crystal polyester amide, (B) 10 to 25 weight parts of styrene series copolymer comprising 40 to 97% by weight of one or more kinds of styrenes, 60 to 3% by weight of glycidylester of an α,β-unsaturated acid expressed by a following general formula (1), and 0 to 50% by weight of another vinyl monomer, the styrene series copolymer having an epoxy equivalent of 300 to 3000 g/eq and a weight average molecular weight of 30000 or more,

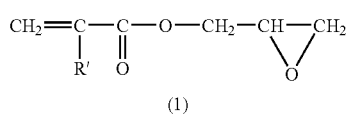

[Chemical 1]

(1)

(where —R' denotes hydrogen or an alkyl group), and (C) 0 to 100 weight parts of one or more kinds of fibrous, particulate, and plate-like fillers, the resin composition having a melt viscosity of 60 to 4000 Pa·s at a temperature higher than the melting point by 20° C. at a shear rate of 1000/sec and a melt tension of 20 mN or more at a take-over speed of 15 m/min; a parison forming step of extruding and forming a cylindrical parison with an extrusion speed equal to or higher than 0.3 kg/minute and lower than 5 kg/minute by using the specific resin composition melt in the resin composition melting step; a mold closing step of placing the parison formed in the parison forming step between a pair of molds forming a cylindrical cavity and of closing the molds; and a forming step of blowing gas into the parison in the molds closed in the mold closing step to form a liner.

The invention as claimed in claim 2 is a method for manufacturing a pressure-resistant container liner by a blow molding, comprising: a resin composition melting step of heating a blow molding liquid crystal resin composition within a temperature range from a melting point to the melting point +40° C. to melt the resin composition, the resin composition being produced by blending, melting and kneading (A) 100 weight parts of liquid crystal polyester and/or liquid crystal polyester amide, (B) 10 to 25 weight parts of styrene series copolymer comprising 40 to 97% by weight of one or more kinds of styrenes, 60 to 3% by weight of glycidylester of an α,β-unsaturated acid expressed by a following general formula (1), and 0 to 50% by weight of another vinyl monomer, the styrene series copolymer having an epoxy equivalent of 300 to 3000 g/eq and a weight average molecular weight of 30000 or more,

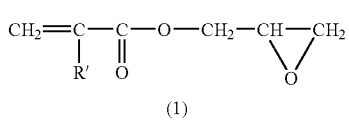

[Chemical 2]

(1)

(where —R' denotes hydrogen or an alkyl group), and (C) 0 to 100 weight parts of one or more kinds of fibrous, particulate, and plate-like fillers, the resin composition having a melt viscosity of 60 to 4000 Pa·s at a temperature higher than the melting point by 20° C. at a shear rate of 1000/sec and a melt tension of 20 mN or more at a take-over speed of 15 m/min; a parison forming step of extruding and forming a cylindrical parison with a shear rate equal to or higher than 50/second and lower than 1000/second by using the specific resin composition melt in the resin composition melting step; a mold closing step of placing the parison formed in the parison forming step between a pair of molds forming a cylindrical cavity and of closing the molds; and a forming step of blowing gas into the parison in the molds closed in the mold closing step to form a liner.

According to the invention as claimed in claim 1 or claim 2, liquid crystal resin composition having a specific melt property is produced by blending liquid crystal polyester and/or liquid crystal polyester amide resin composition with epoxy modified polystyrene resin and by melting and kneading them, and the liquid crystal resin composition is heated at a specific temperature to be melted. Then, a cylindrical parison is subjected to blow molding by being extruded at a specific extrusion speed or a shear rate. Consequently, the tensile breaking elongation of "2% or more" can be achieved in all directions in consideration with the anisotropic characteristics in a trunk section of a liner, and the tensile breaking elongation of "1% or more" can be achieved in a pinch-off section of the liner. Moreover, a liner having a superior gas barrier property can be obtained by making the most of the property of the liquid crystal resin.

The invention as claimed in claim 3 is characterized in that in the method for manufacturing a pressure-resistant container liner as claimed in claim 1 or 2, a resin composition in which an increase rate of a melt tension (which is called as a melt tension increase rate) at a twice take-over speed (30 m/minute) to the melt tension at the take-over speed of 15 m/minute is 1.05 or more, is used.

According to the invention as claimed in claim 3, the liner has an appropriate increase rate of the melt tension at a twice take-over speed (30 m/minute) to the melt tension at a take-over speed of 15 m/minute. Because a blow molding is easily carried out, a high-quality liner can be manufactured with a high yield.

The invention as claimed in claim 4 is characterized in that in the method for manufacturing a pressure-resistant container liner as claimed in any of claims 1 to 3, when the mold closing step is performed, a value obtained by dividing a mold closing pressure by a thickness of a pinch-off section is of 3.5 MPa/cm or more.

According to the invention as claimed in claim 4, when the mold closing step is performed, a value obtained by dividing the mold closing pressure by the thickness of the pinch-off section is a specific threshold value (3.5 MPa/cm) or more. Thus, the adhesiveness of the liquid crystal resin in the pinch-off section of the liner is increased and the tensile breaking elongation of the pinch-off section can be improved.

The invention as claimed in claim 5 is characterized in that in the method for manufacturing a pressure-resistant container liner as claimed in any of claims 1 to 4, two-stage pinch sections are provided in the molds and a space is formed between the two-stage pinch sections when the molds are closed in the mold closing step.

According to the invention as claimed in claim 5, two-stage pinch sections are provided in the molds and a space is formed between the two-stage pinch sections when the molds are closed in the mold closing step. Thus, when the parison is cut off in the mold closing step, the liquid crystal resin can be stored in the space formed between the two-stage pinch sections. Therefore, when the mold closing is carried out, it can be prevented that the liquid crystal resin flows out of the pinch-off section of the liner to the outside of the mold. The Pinch-off section of the liner can be prevented from being thinner. As a result, it is possible to increase the adhesiveness of the pinch-off section and to improve the tensile breaking elongation of the pinch-off section.

The invention as claimed in claim 6 is a liquid crystal resin liner manufactured by the method for manufacturing the pressure-resistant container liner as claimed in any one of claims 1 to 5, wherein a tensile breaking elongation in all directions of a trunk section is 2% or more and a tensile breaking elongation in a pinch-off section is 1% or more.

According to the invention as claimed in claim 6, in the liquid crystal resin liner, the tensile breaking elongation in all directions of the trunk section is "2% or more" and the tensile breaking elongation in the pinch-off section is "1% or more". Thus, it is possible to satisfy the properties required for the trunk section and the pinch-off section of the pressure-resistant container liner. Furthermore, because of the property of the liquid crystal resin, the liquid crystal resin liner according to the present invention can have a superior gas barrier property. Thus, the liquid crystal resin liner can be suitably used as a pressure-resistant container liner instead of a high density polyethylene liner.

The invention as claimed in claim 7 is characterized in that in the liquid crystal resin liner as claimed in claim 6, the pinch-off section has a thickness of 2 mm or more.

According to the invention as claimed in claim 7, in the liquid crystal resin liner, the pinch-off section has a thickness of the specific threshold value (2 mm) or more. Thus, the adhesiveness of the pinch-off section is increased and the liner has a high tensile breaking elongation.

Effect of the Invention

According to the present invention, the liquid crystal and/or the liquid crystal polyester amide is mixed with the epoxy modified polystyrene resin to generate a liquid crystal resin composition having a specific melt property by melting and kneading them. The liquid crystal resin composition is heated and melted at a specific temperature and a cylindrical parison is extruded at a specific extrusion speed or a shear rate to perform a blow molding. Thus, it is possible to increase the "tensile breaking elongation" of a blow-molded product (pressure-resistant container liner) and to improve the "anisotropic characteristics". As a result, the pressure-resistant container liner which effectively uses a superior gas barrier property of the liquid crystal resin can be obtained.

BEST MODE FOR CARRYING OUT THE INVENTION

Figure 1:
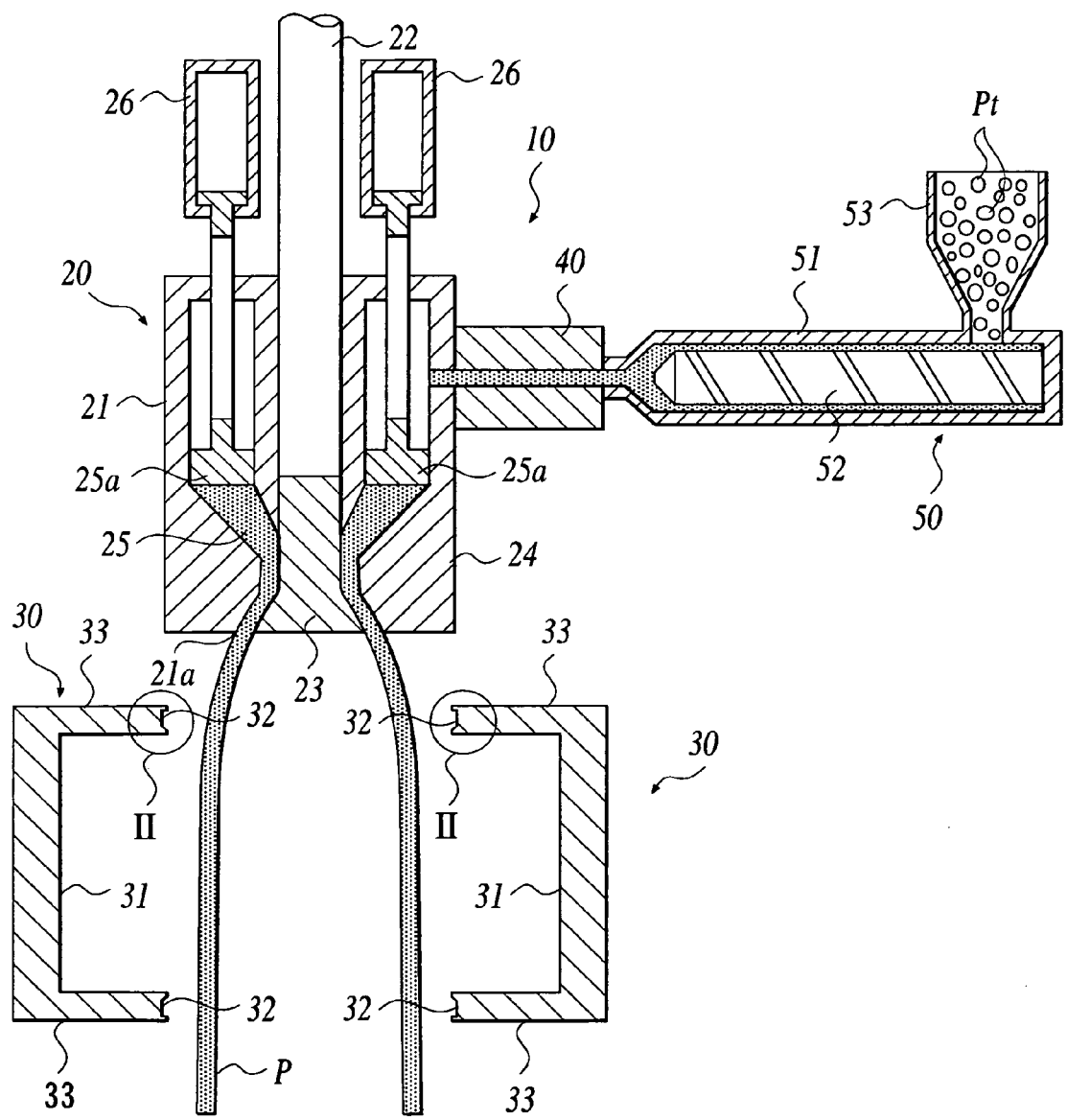
FIG. 1 This is an explanation view for explaining the structure of a blow molding machine and the like, which are used for a manufacturing method according to an embodiment of the present invention.

Hereinafter, an embodiment of the present invention will be described in detail with reference to the drawings.

First, a liquid crystal resin composition that is used for a manufacture method according to an embodiment of the present invention will be described.

<Configuration and Property of Liquid Crystal Resin Composition According to the Present Invention>

The liquid crystal polyester and/or the liquid crystal polyester amide (A) that are used for the present invention are nematic liquid crystal polyester and/or liquid crystal polyester amide, respectively, which shows an optical anisotropic characteristics at the time of being melted, and resin composition which has melt viscosity of 60 to 4000 Pa·s at a shear rate of 1000/second at a temperature higher than the melting point by 20° C. (which is called as a temperature T1) and has melt tension of 20 mN or more at a take-over speed of 15 m/minute is adopted. The characteristics of melt anisotropy can be checked by an ordinary polarization inspection process using an orthogonal polarizer. To put it concretely, a sample placed on a Leitz hot stage is melted, and the characteristics can be checked by observing the sample in a nitrogen atmosphere with a Leitz polarization microscope at about 40-fold magnification. Polarized light transmits the polymer having the optically anisotropic characteristics even in a melted resting liquid state when the polymer is put between the orthogonal polarizers.

By using this sort of liquid crystal polyester and/or liquid crystal polyester amide, superior properties such as a very low gas permeation property, dimensional stability, chemical resistance and the like, can be realized.

To put it more concretely, the liquid crystal polyester and/or the liquid crystal polyester amide are the ones including the constitutional units expressed by the following general formulae (2), (3), (4), and (5). The liquid crystal polyester and/or the liquid crystal polyester amide are the aromatic polyester/polyester amide, respectively, including at least 30 mol % or more of an aromatic hydroxy-carboxylic group expressed by the general formula (2), and also includes aromatic polyester/polyester amide, respectively, containing 25 mol % or less of a repeating unit including a dicarboxylic acid group expressed by the general formula (3) and diol expressed by the general formula (4) and 20 mol % or less of a repeating unit containing aromatic hydroxyamine expressed by the general formula (5).

[Chemical 3]

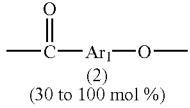

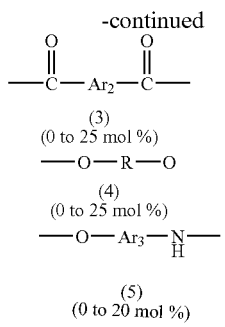

(3)
(0 to 25 mol %)

—O—R—O—
(4)
(0 to 25 mol %)

—O—Ar₃—N—
         |
         H
(5)
(0 to 20 mol %)

[where —Ar₁— denotes a divalent phenylene group and/or a naphthalene group; —Ar₂— denotes one kind, or two or more kinds selected from divalent aromatic groups and aliphatic groups having carbon numbers 2 to 8; —R— denotes one kind, or two or more kinds selected from divalent aromatic groups and aliphatic groups having carbon numbers 2 to 8; and —Ar₃— denotes one kind, or two or more kinds selected from divalent aromatic groups and aliphatic groups having carbon numbers 2 to 8.]

The —Ar₁— of the formula (2) constituting the main repeating unit of the liquid crystal polyester and/or the liquid crystal polyester amide, which are used for the present invention, is composed of the phenylene group and/or the naphthalene group, and is obtained by the condensation polymerization of these aromatic hydroxycarboxylic acids or their ester forming compounds. As the examples of these aromatic hydroxycarboxylic acid compounds, the aromatic hydroxycarboxylic acids or their ester forming compounds such as 4-hydroxy benzoic acid, 2-hydroxy-6-naphthoic acid, 2-hydroxy-7-naphthoic acid, and 4-(4-hydroxyphenyl)benzoic acid can be cited, and one kind, or two or more kinds of their mixtures may be used. In particular, as the constitutional units expressed by the formula (2), the constitutional units, each including a 4-hydroxy benzoic acid group as the main ingredient and a hydroxy naphthoic acid group as a part thereof, is preferable. In particular, when the constitutional unit expressed by the formula (3), which will be described later, does not exist or exists by a very small quantity as the constitutional units of the polyester to be used, it is especially preferable in view of the moldability that the constitutional unit expressed by the formula (2) is composed of the two kinds mentioned above.

Next, the —Ar₂— of the formula (3) and the —Ar₃— of the formula (5) constituting the liquid crystal polyester and/or the liquid crystal polyester amide (A), which are used for the present invention, are a phenylene group, a naphthalene group, and a diphenylene group, or may be an aliphatic group within a range of holding a liquid crystallinity. Moreover, the —R— expressed by the formula (4) is a phenylene group, a naphthalene group, a biphenylene group, and the like, and may be an aliphatic group having a carbon number of 2 to 8. The constitutional units expressed by the formulae (3), (4), and (5) are formed of a dicarboxylic acid (HOOC—Ar₂—COOH) or an ester forming compound thereof, diol (HO—R—OH), and hydroxyamine (HO—Ar₃—NH₂), as raw materials. The constitutional units are introduced by the condensation polymerization reactions of the acid components and the diol components together with the aromatic hydroxycarboxylic acids or their ester forming compounds. As the dicarboxylic acid components for constituting the unit expressed by the formula (3), publicly known aromatic dicarboxylic acids or their ester forming compounds, such as a terephthalic acid, a 2,6-naphthalene dicarboxylic acid, an isophthalic acid, a 2,7-naphthalene dicarboxylic acid, and a 4,4'-diphenylcarboxylic acid, can be cited. Moreover, as the diol for constituting the unit expressed by the formula (4), one kind, or two or more kinds of publicly known aromatic diol, such as hydroquinone, nuclear-substituted hydroquinone, 4,4'-biphenol, 2,6-dihydroxy naphthalene, and bisphenol A, or aliphatic diol, such as ethylene glycol and cyclohexane dimethanol, can be used. Moreover, as the aromatic hydroxyamine for constituting the unit expressed by the formula (5), one kind, or two or more kinds of 4-aminophenol, 4-acetamidophenol, 3-aminophenol, 3-methyl-4-aminophenol, 2-chloro-4-aminophenol, 4-amino-1-naphthol, 4-amino-4'-hydroxybiphenyl, 4-amino-4'-hydroxydiphenylmethane can be used.

The liquid crystal polyester and/or the liquid crystal polyester amide (A) that are preferably used for the present invention severally include 30 mol % or more of the constitutional unit expressed by the formula (2), 25 mol % or less of the unit expressed by the formula (3), 25 mol % or less of the unit expressed by the formula (4), and 20 mol % or less of the unit expressed by the formula (5). More preferably, the liquid crystal polyester and/or the liquid crystal polyester amide (A) severally include 45% or more of the unit expressed by the formula (2), 20% or less of the unit expressed by the formula (3), 20% or less of the unit of the formula (4), and 15 mol % or less of the unit expressed by the formula (5). Furthermore preferably, the liquid crystal polyester and/or the liquid crystal polyester amide (A) severally include 60% or more of the unit expressed by the formula (2), 20% or less of the unit expressed by the formula (3), and 20% or less of the unit expressed by the formula (4). Incidentally, the liquid crystal resin (A) used for the present invention may further introduce a comonomer component including an ether bond within a range of holding the liquid crystallinity at the time of melting besides the units expressed by the formulae (2), (3), (4), and (5). Moreover, the liquid crystal resin (A) may be also the ones introducing a multifunctional ester forming monomer, such as pentaerythritol, a trimellitic acid, a trimesic acid, and a 4-hydroxyisophthalic acid, or the ones introducing an ester forming monomer including an ionizable group, such as a sodium sulphoisophthalic acid and a sodium parahydroxyethylphenyl sulfonic acid, within a range of holding the liquid crystallinity. The especially preferable liquid crystal resins (A) are aromatic copolyesters including a 4-hydroxy benzoic acid and a 2-hydroxy-6-naphthoic acid, and an aromatic copolyester/polyester amide obtained by causing the copolymerization of the monomers of combined acid components, such as a terephthalic acid and an isophthalic acid, and diol components, such as hydroquinone, 4,4'-biphenol, and ethylene glycol, besides the aromatic copolyester.

The produce of the liquid crystal polyester and/or the liquid crystal polyester amide (A) that are used for the present invention can be performed by a publicly known process from the monomer compounds mentioned above by the use of a direct polymerization process or an ester exchange process. However, a melting polymerization process, a slurry polymerization process, and the like, are normally used. The compounds mentioned above, which have an ester forming ability severally, may be used for the polymerization in their original forms, or may be used in the forms of the derivatives modified to have the ester forming abilities from their precursors at the previous steps of the polymerization. Various catalysts can be used at the time of the polymerization of these precursors. As the typical catalysts, a dialkyltin oxide, a diaryltin oxide, titanium dioxide, alkoxy titan silicates, titanium alcoholates, the alkali metal salts and the alkaline earth metal salts of carboxylic acids, Lewis acid salts such as BF3, and the like, can be cited. It is generally preferable that the usage of the catalysts is about 0.001% to 1% by weight of the whole weight of the monomers, and it is especially preferable that the usage is about 0.01% to 0.2% by weight. The increases of the molar weights of the polymers produced by these polymerization processes can be achieved by the solid phase polymerization to heat the polymers in a decompressed atmosphere or in an inert gas if the increases are required furthermore.

Incidentally, the liquid crystal polyester and/or the liquid crystal polyester amide (A) may be a mixture of two or more kinds of liquid crystal polyesters and two or more kinds of liquid crystal polyester amides, respectively.

The melting points by DSC of the liquid crystal polyester and/or the liquid crystal polyester amide (A) that are used for the present invention is 270° C. to 370° C., preferably 290° C. to 320° C., and their melt viscosity at a temperature (temperature T1) higher than the melting point by 20° C. at the shear rate of 1000/sec is within a range from 20 to 60 Pa·s.

In the case of a liquid crystal resin having a melting point lower than 270° C., the resin composition of the resin is low in the mechanical properties, and consequently the use of the resin is limited in the fields requiring the strength in a single layer. When the melting point exceeds 370° C., it is impossible to suppress secondary reactions, such as decomposition at a high temperature, when the liquid crystal resin is melted to be kneaded with a modified styrene series copolymer (B), which will be described later. Consequently, no liquid crystal resin composition having a sufficient quality can be obtained.

Moreover, in the case where the melt viscosity at the temperature T1 and at the shear rate of 1000/sec is out of the range mentioned above, the dispersion of the modified styrene series copolymer (B) becomes inferior, and consequently the improvement of the drawdown resistance property and the uniform thickness property of the copolymer (B) at blow molding become insufficient. As a result, the insufficiency exerts harmful influences also onto the mechanical strength and the low gas permeation property of a molded product.

Next, the styrene series copolymer of the (B) component of the present invention is blended into the substrate liquid crystal resin (A), and the melt tension of the copolymer is improved to suppress the drawdown. Thus, the effect of remarkably improving the blow molding property of the copolymer can be obtained. The styrene series copolymer of the sort of (B) component is a styrene series polymer composed of 40 to 97% by weight of styrenes and 60 to 3% by weight of glycidylester of an α,β-unsaturated acid expressed by the general formula (1).

As the styrenes mentioned above, styrene, α-methyl styrene, brominated styrene, divinylbenzene, and the like, can be cited. However, the styrene is preferably used.

As the glycidylester unit of the α,β-unsaturated acid expressed by the formula (1), for example, a glycidyl acrylate ester, a glycidyl methacrylate ester (hereinafter sometimes referred to as GMA), and a glycidyl ethacrylate ester can be cited, and the glycidyl methacrylate ester (GMA) is particularly preferably.

When the contained amount of the glycidylester unit of the α,β-unsaturated acid expressed by the formula (1) is too large, a composition easily gels. A problem is caused in the blow molding property, and the surface state of the molded product is worsened. Consequently, such a state is not preferable. When the contained amount of the glycidylester unit is too small, the improvement effect of the blow molding property, such as the melt tension and the drawdown property, cannot be obtained. Accordingly, the contained amount of the unit expressed by the formula (1) in the (B) component is limited to be 60 to 3% by weight. 50 to 5% by weight is preferable.

Incidentally, the styrene series copolymer (B) may be a multicomponent copolymer produced by the copolymerization using another kind or more of vinyl monomers besides the two components mentioned above. The suitable ones as this sort of a third component are acrylonitrile, vinyl ethers; vinyl esters, such as vinyl acetate, vinyl chloride, and vinyl propionate; maleic anhydride, phenylmaleimide, and the like. In particular, the acrylonitrile is the most suitable as the third component, and a terpolymer produced by introducing 50% by weight or less, preferably 40% by weight or less, of the acrylonitrile further has a superior effect for the improvement of the blow molding property. Although a multicomponent copolymer produced by introducing a small quantity of another vinyl series monomer as an accessory ingredient other than those ones mentioned above subsidiarily, the containment of an olefin series component, such as ethylene, propylene, and butene-1, rather reduces the effect, and consequently the containment is not preferable.

The styrene series copolymer, which is the (B) component of the present invention, can be easily produced from the monomer of each component by an ordinary radical polymerization process with a radical polymerization catalyst. Incidentally, a graft copolymer produced by bonding a small quantity of vinyl series polymer to a linear copolymer chemically as branches or cross-links may be used as the copolymer of the (B) component of the present invention. As the vinyl series monomers to form the sort of the branch segments or cross-link segments, an acrylic acid, an acrylic alkyl ester, a methacrylic acid, a methacrylic alkyl ester, styrene, acrylonitrile, and the like, can be cited. The copolymer having this sort of branch structure or the cross-link structure can be made to be a graft copolymer by, for example, causing the copolymerization of at least one kind of the vinyl series monomers mentioned above with a radically polymerized organic peroxide under the existence of the linear copolymer mentioned above to produce a peroxy-copolymer, and by heating and kneading the copolymerized monomer. However, it is required that at least the (B) component to be used for the present invention itself is a fluid material at a melting and kneading temperature, and it is preferable to use a material having viscosity lower than that of the liquid crystal resin (A) at the melt-kneading temperature as the component (B). In particular, the viscosity of the (B) component is preferably a half or less than that of the (A) component. The copolymers having large molar weights and high melt viscosity and highly grafted copolymers have worsened flowability, inferior dispersibility to the liquid crystal resin (A), decreased improvement effects of blow molding properties, such as melt tension and drawdown properties, and the inferior surface states of molded products, and consequently the polymers are not preferable.

The (B) epoxy modified styrene series copolymer used for the present invention is required to have a weight-average molecular weight of 30000 or more. When the weight-average molecular weight is below 30000, not only the smallness of the improvement effect of the drawdown resistance property but also the apprehensiveness of the decrease of the viscosity caused by the melt staying in the blow molding machine exist, and the copolymer is not preferable.

Moreover, the (B) epoxy modified styrene series copolymer used for the present invention is required to have an epoxy equivalent of from 300 to 3000 g/eq, more preferably from 500 to 3000 g/eq. When the epoxy equivalent exceeds 3000 g/eq, the effects to the blow molding property, such as the drawdown property, is not realized. Moreover, when the epoxy equivalent is less than 300 g/eq, the melt viscosity of the resin becomes remarkably higher, and the disadvantages, such as the worsening of the productivity of compounds and the impossibility of molding owing to the appearance of an insoluble matter at the time of blow molding, occur, and the sort of copolymer is not preferable.

As the commercially available raw materials of the (B) epoxy modified styrene series copolymer preferable for the use of the present invention having these sorts of properties, Marproof G-1010S available from Nippon Oil & Fats Co., Ltd. can be cited.

The addition quantity of the sort of styrene series copolymer of the (B) component is 10 to 25 weight parts, preferably 10 to 20 weight parts, to 100 weight parts of that of the (A) component. When the addition quantity is too small, the increases of the melt viscosity and the melt tension of the resin composition are insufficient, and the molding of the copolymer becomes difficult. Consequently, the uniform thickness property of the molded product decreases. When the addition quantity is too much, the melt stretchability of the copolymer decreases at the time of blowing up, and it becomes difficult to obtain a favorable liner.

Fibrous, particulate, and plate-like fillers may be further added by being added as a (C) component to the liquid crystal resin composition used for the blow molding or the extrusion molding of the present invention according to an object. These sorts of fillers are effective for the mechanical properties of a molded product, in particular for giving strength and rigidity. As the fibrous fillers, inorganic fibrous materials, such as glass fiber, asbestos fiber, carbon fiber, silica fiber, silica-alumina fiber, zirconia fiber, boron nitride fiber, silicon nitride fiber, boron fiber, potassium titanate fiber, and the fibrous materials of metals, such as stainless, aluminum, titanium, copper, and brass can be cited. In particular, a typical fibrous filler is glass fiber. On the other hand, as the particulate fillers, carbon black; silicates, such as silica, quartz powder, glass bead, glass powder, calcium silicate, aluminum silicate, kaolin, talc, clay, diatomaceous earth, and wollastonite; oxides of metals, such as an iron oxide, a titanium oxide, a zinc oxide, and alumina; carbonates of metals, such as a calcium carbonate and a magnesium carbonate; sulfates of metals, such as a calcium sulfate and a barium sulfate; silicon carbide; a silicon nitride; a boron nitride; various kinds of metal powder, and the like, can be cited. Moreover, as the plate-like fillers, mica, glass flakes, various metal foils, and the like, can be cited. One kind, or two or more kinds of these inorganic fillers can be used at the same time. The simultaneous use of one of the fibrous fillers, in particular, the glass fiber, and one of the particulate fillers or the plate-like fillers is a preferable combination in view of having superior mechanical strength, dimensional accuracy, electrical properties, and the like, of a molded product, and in particular, the simultaneous use is also effective for the improvement of the blow moldability. It is desirable to use a bundling agent or a surface treatment agent at the time of using these fillers. The examples of the bundling agents or the surface treatment agents are functional compounds, such as epoxy compounds, isocyanate series compounds, titanate series compounds, and silane series compounds. The addition quantity of each of the fillers, which is the (C) component of the present invention, is 100 weight parts or less, preferably 70 weight parts or less, to 100 weight parts of the (A) component. When the addition quantity is smaller, the tendency of lowering the rigidity, the strength, and the like, thereof is caused. Moreover, when the addition quantity exceeds 100 weight parts, the excess hinders molding, and it is not preferable.

The liquid crystal resin composition for blow molding of the present invention is prepared by melt-kneading the (A) liquid crystal resin and the (B) epoxy modified styrene series copolymer, and further the (C) filler according to circumstances. The melt viscosity of the resin composition is 15 to 400 Pa·s, preferably 150 to 400 Pa·s, at a temperature (temperature T1) higher than the melting point of the (A) component by 20° C. at a shear rate 1000/sec. The melt tension of the resin composition is 20 mN or more, preferably 50 to 200 mN, particularly 60 to 180 mN, as the values at the temperature T1 at a take-over speed 15 m/min.

When the melt viscosity and the melt tension are less than the ranges mentioned above, the drawdown resistance property is insufficient. When the melt viscosity and the melt tension exceed the ranges mentioned above, the stretchability and the uniform thickness property of the liquid crystal resin composition decrease, and the liquid crystal resin composition is unsuitable for the blow molding.

Moreover, it is desirable that the increase rate (melt tension increase rate) of the melt tension of the resin composition at a twice take-over speed of 30 m/min to that of 15 m/min at the temperature T1 is 1.05 times or more, preferably 1.07 to 1.50 times. When the melt tension increase rate is less than the range mentioned above, it is difficult to perform blow molding.

Here, the melt tension increase rate closely pertains to the uniform thickness property, and is a very important property in order to obtain a molded product having a uniform thickness. That is, when the melt tension increase rate is 1.05 times or less, a parison does not swell uniformly at the step of blowing a gas into the parison in blow molding, and the parison explodes in some cases. In order to obtain the preferable melt tension increase rate, it is indispensable to use an epoxy modified styrene series copolymer having a weight-average molecular weight of 30000 or more as the (B) component. When the weight-average molecular weight is below 30000, the melt tension increase rate becomes below 1.05 times, and the parison does not swell at a uniform thickness to explode. Consequently, no blow molding articles can be obtained, or no molded products having a uniform thickness can be obtained, even when any molded products can be obtained.

Furthermore, it is also possible to use another thermoplastic resin subsidiarily together with the polymers mentioned above in the liquid crystal resin composition of the present invention. As the other thermoplastic resin used here, any ones as long as they are stable at high temperatures may be used. For example, a polyamide series polymer, a polyester series polymer other than those mentioned above, a styrene series (co)polymer other than those mentioned above, polycarbonate, a polyphenylene oxide, polyphenylene sulfide, polyalkyl acrylate, polyacetal, polysulfone, polyether sulphone, polyether imide, polyether ketone, a fluoride resin, (modified) polyolefin, and the like, can be cited. Moreover two or more kinds of these thermoplastic resins can be used by being mixed with one another. In particular, as preferable thermoplastic resins among them, polyamide series resins, such as nylon 6, nylon 66, nylon 12, and their copolymers, can be cited. The addition quantity at the time of blending each of these polyamide series resins is preferably 100 weight parts or less to the 100 weight parts of the component (A). In particular, the addition quantity is preferably 60 weight parts or less. The polyamide series resin increases a melt tension to stabilize a parison, and has an effect of improving the drawdown resistance property of the parison. However, when the addition quantity is too much, the properties of the resin of the component (A) are lost, and the state is not preferable. Moreover, also a thermoplastic polyester series polymer, which does not show the liquid crystallinity, is an especially preferable thermoplastic resin to be used together. For example, polyethylene terephthalate and a bisphenol A/terephthalic acid/isophthalic acid copolymer can be cited. The addition quantities of these polyester series polymers are preferably 100 weight parts or less to 100 weight parts of the component (A). In particular, the addition quantities are preferably 60 weight parts or less. When the addition quantities of the polyester series polymers are too much, the resin properties of the component (A) are lost. This state is not preferable.

Furthermore, publicly known materials that are generally added to a synthetic resin, that is, a stabilizer, such as an antioxidant and an ultraviolet light absorber, an antistatic agent, a fire retardant, a coloring agent, such as a dye and a pigment, an internal lubricant, a mold-lubricant, a crystallization accelerating agent, a crystal nucleating agent, and the like, can be suitably added to the liquid crystal resin composition of the present invention according to a performance requirement.

The composition of the present invention is produced as follows: adding and blending the (A), (B), and (C) components mentioned above; performing their melt-kneading processing; melt-kneading with other desired components added in some cases; and supplying the components to blow molding. The melt-kneading of the sort of each component may be performed to be supplied to the blow molding after being once pelletized with a single or double extruder, or it is also possible to supply the component to the molding as a parison for blow molding immediately after the melt-kneading. Moreover, the components (A), (B), and (C) may be subjected to the melt-kneading processing at once, or each component may be mixed after being separately kneaded. Each component may be added by being divided to two or more times, and may be subjected to the melt-kneading. In the case of using a versatile extruder, the melt-kneading temperature is 270 to 380° C., preferably 280 to 360° C., and a melt-kneading time is preferably for 2 to 5 minutes.

The liquid crystal polyester and/or the liquid crystal polyester amide (A), which have been described above, severally have a melting point of 270 to 370° C. by DSC. It is preferable that their melt viscosity is within a range of 20 to 60 Pa·s at a temperature (temperature T1) higher than the melting point by 20° C. at a shear rate of 1000/sec.

When the melting point of the liquid crystal resin is below 270° C., the mechanical properties of the resin composition are low, and the use of the resin in a field in which the strength as a single layer is required is limited. When the melting point exceeds 370° C., it is impossible to suppress the secondary reactions, such as decomposition, at high temperatures at the time of the melt-kneading with the epoxy modified polystyrene resin (B), and consequently a liquid crystal resin composition having a sufficient quality cannot be obtained in some cases.

Moreover, when the melt viscosity is out of the range mentioned above at the temperature T1 at the shear rate of 1000/sec, the dispersion of the epoxy modified polystyrene resin (B) becomes inferior, and the improvements of the drawdown resistance property and the uniform thickness property at the time of molding, such as blow molding, become insufficient. As a result, the mechanical properties and the low gas permeation property of a molded product are sometimes harmfully influenced.

The resin composition according to the present invention is composed of 10 to 25 weight parts, preferably 10 to 20 weight parts, of the epoxy modified polystyrene resin (B) to 100 weight parts of the liquid crystal polyester and/or the liquid crystal polyester amide (A).

When the addition quantity of the (B) component is less than the range mentioned above, the increases of the melt viscosity and the melt tension of the resin composition are insufficient. If the addition quantity of the (B) component is more or equal to range mentioned above, then the uniform thickness property of the molded product decreases.

The resin composition of the present invention is produced by melt-kneading the liquid crystal polyester and/or the liquid crystal polyester amide (A) with the epoxy modified polystyrene resin (B), and the melt viscosity of the resin composition at the temperature T1 at the shear rate 1000/sec is 60 to 4000 Pa·s, preferably 80 to 1000 Pa·s. The melt tension thereof at the take-over speed 15 mm/min is 20 mN or more, preferably 50 to 200 mN.

When the melt viscosity and the melt tension are less than the ranges mentioned above, the drawdown resistance property thereof is insufficient. When the melt viscosity and the melt tension exceed the ranges mentioned above, the stretchability and the uniform thickness property thereof decrease, and the state is unsuitable for blow molding.

Moreover, the melt tension increase rate at the twice take-over speed of 30 mm/min to the melt tension at the take-over speed of 15 mm/min is 1.05 times or more, preferably 1.1 to 2.0 times.

When the melt tension increase rate is out of the range mentioned above, it becomes difficult to perform blow molding.

Next, with reference to FIG. 1 and FIG. 2, an example of the structure of a blow molding machine and the like, which is used for the producing process according to an embodiment of the present invention will be described.

As shown in FIG. 1, a blow molding machine 10 comprises an accumulator head 20 for extruding the liquid crystal resin which is introduced in the heated and melt state through a circular gap to form a cylindrical parison P, a pair of molds 30 which are symmetrically arranged along the longitudinal axis of the parison P and which are provided so as to be contact with and depart from each other, and a blow pin (not shown) which is driven by a predetermined driving device to blow compressed air into the parison P during the blow molding process.

As shown in FIG. 1, the accumulator head 20 includes: a main body 21 on a hollow cylinder (hereinafter referred to as "head main body"); a center shaft 22 provided along the center axis of the head main body 21 in the up-and-down direction; a core 23 fixed to the lower end side of the center shaft 22; and a die 24 which is provided at the lower end part of the head main body 21 and which is provided at the outer periphery part of the core 23. By moving the center shaft 22 up and down, the position of the core 23 in the up and down direction is changed with respect to the die 24 to adjust the distance between the core 23 and the die 24. Therefore, it is possible to appropriately adjust the thickness of the parison P.

In the head main body 21 of the accumulator head 20, an extrusion cylinder 25 for extruding the liquid crystal resin composition toward an extrusion opening 21a formed by the core 23 and the die 24 after storing the supplied liquid crystal resin composition once, is formed. A driving device 26 of the oil pressure type is attached to a piston 25a of the extrusion cylinder 25.

Figure 2:
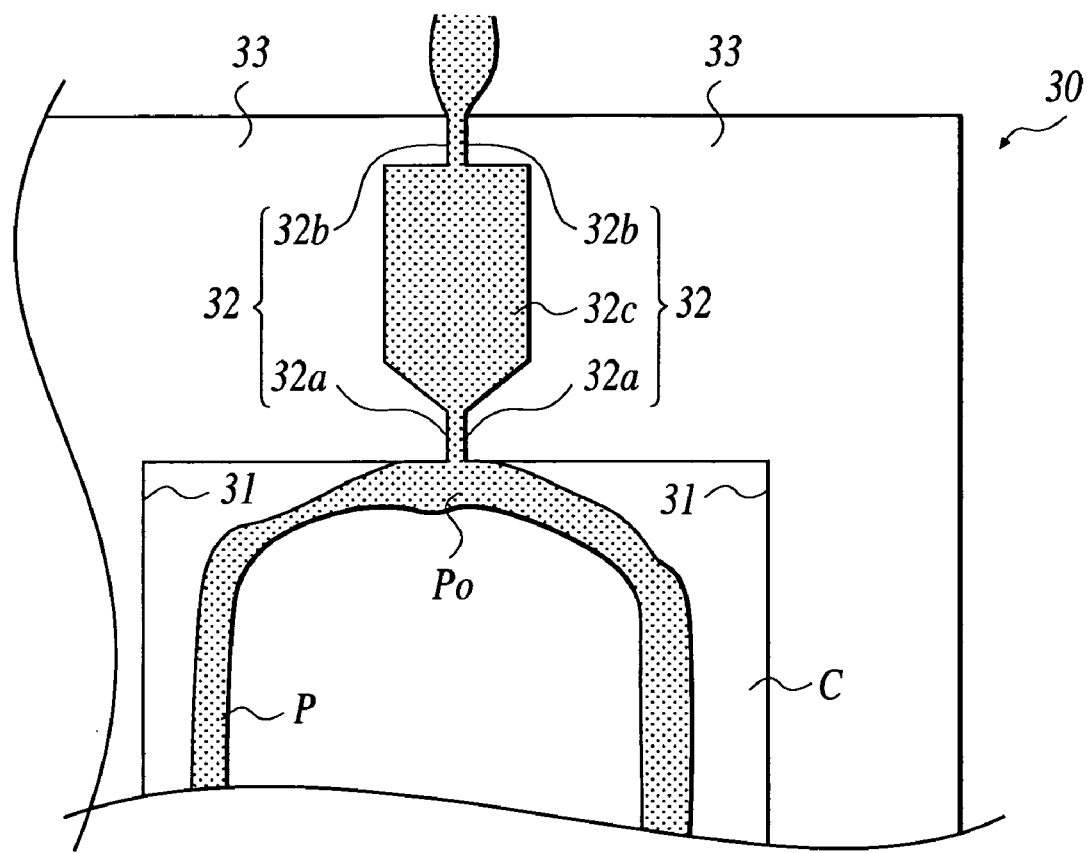
FIG. 2 This is an enlarged view of a two-stage pinch section (section II) of a mold of the blow molding machine shown in FIG. 1.
Figure 3:
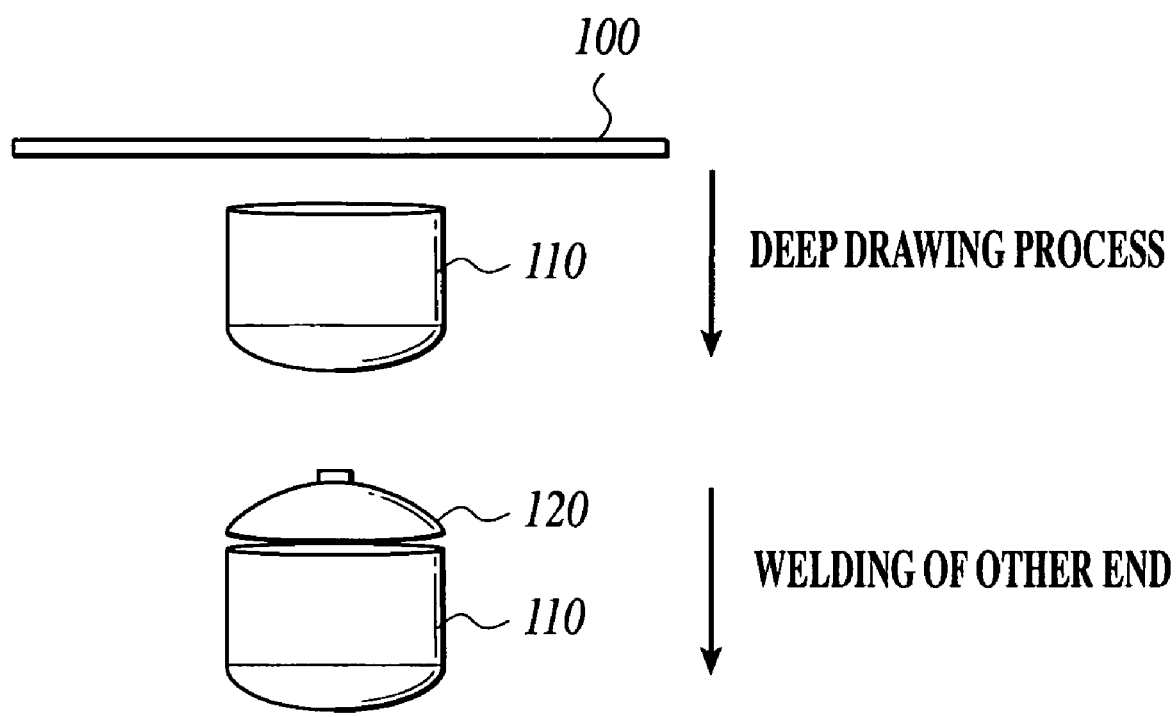
FIG. 3 This is an explanation view for explaining a conventional method for manufacturing a metal liner.
Figure 4:
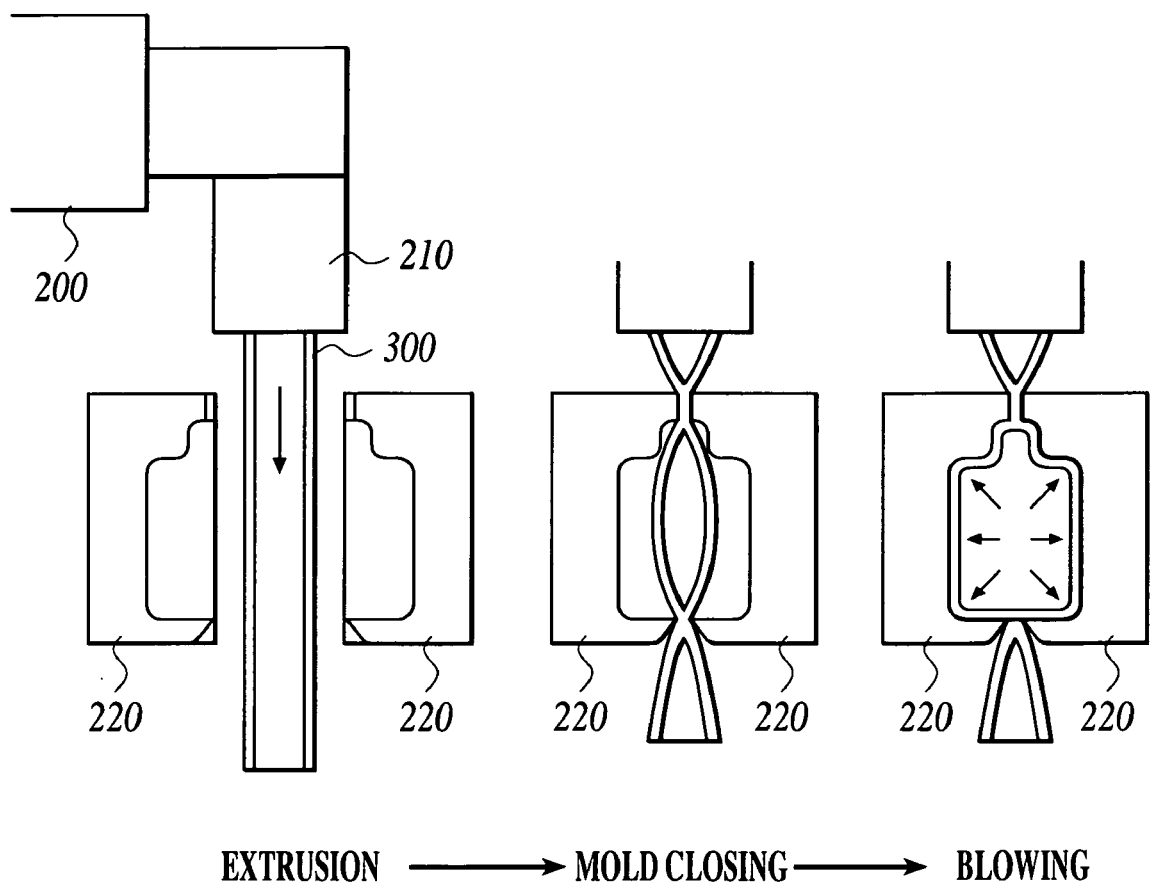
FIG. 4 This is an explanation view for explaining a conventional method for manufacturing a resin liner by a blow molding.

As shown in FIG. 1 and FIG. 2, each of the left and right molds 30 includes a molding face 31 for forming a cylindrical cavity C when the molds are closed, and two-stage pinch sections 32 for cutting the upper and lower end portions of the parison P. The cavity C formed by the left and right molding faces 31 has the same shape as the outer shape of a pressure-resistant container liner to be produced. The left and right molds 30 are driven to open and close by an open/close driving device (not shown).

The two-stage pinch sections 32 of the molds 30 are provided at end portions of upper and lower wall faces 33 provided perpendicularly to the longitudinal axis of the parison. As shown in FIG. 2, the two-stage pinch sections 32 comprise a first pinch 32a on the inner side (cavity C side) and a second pinch 32b on the outer side. Thus, when the molds 30 are closed, a space 32c sandwiched by the first pinch 32a and the second pinch 32b is formed in the intermediate section of the end portions of the wall faces 33 in the up and down direction. The space 32c functions as a "resin storage" when the molds 30 are closed and a parison P is cut off by the two-stage pinch sections 32. The liquid crystal resin composition is prevented from flowing from the pinch-off section of the parison P to the outside.

As shown in FIG. 1, a material supply device 50 for supplying the liquid crystal resin composition into the accumulator head 20 via a connection block 40, is connected to the upper side face of the accumulator head 20 of the blow molding machine 10. The material supply device 50 includes: a cylindrical cylinder main body 51; a screw 52 rotatably contained in the cylinder main body 51; and a hopper 53 for putting pellets Pt as a molding material into the cylinder main body 51.

The operation of each of the above-described driving devices of the blow molding machine 10 (e.g., the driving device 26 for driving the extrusion cylinder 25 of the accumulator head 20, the open/close driving device of the mold 30, the driving device of the blow pin) is controlled and the operation of the screw 52 of the material supply device 50 is controlled by a control device (not shown). On the outer periphery side of the mold 30 and the outer periphery side of the cylinder main body 51 of the material supply device 50, heaters (not shown) for heating the interior of the molds 30 and that of the cylinder main body 51 to a predetermined temperature, are provided.

Next, the process for producing the pressure-resistant container liner by a blow molding by using the liquid crystal resin composition and the blow molding machine 10 and the like, will be explained. The pressure-resistant container liner produced by the produce process according to this embodiment is a liner made of liquid crystal resin according to the present invention.

First, the pellets Pt of the above liquid crystal resin composition, which are provided in pellet-like shape are put into the hopper 53 of the material supply device 50 shown in FIG. 1. By rotating the screw 52 at a predetermined rotation rate and by heating the cylinder main body 51 using the heaters, the pellets Pt are heated and melt in the cylinder main body 51 (resin composition melting step).

The heating temperature in the resin composition melting step is required to be equal to or higher than the melting point of the liquid crystal resin according to the present invention (270 to 370° C.) and is required to be equal to or lower than a temperature of the melting point +40° C. (preferably a temperature range from the melting point to the melting point +30° C.). In order to improve the drawdown resistance property of the liquid crystal resin composition, the heating temperature is desirably lowered. In consideration with the stretchability during the melting required for the blowup, the heating temperature is required to be equal to or higher than the melting point. There is a difference in the molding processability between not less than the melting point and lower than the melting point. Although the composition can be processed at a heating temperature lower than the melting point, the melt stretchability (tensile breaking elongation) of the composition is deteriorated. Therefore, the superior property of the liquid crystal resin composition cannot be used. On the other hand, when the heating temperature exceeds the melting point +40° C., the drawdown resistance property is deteriorated and the above heating temperature is not preferred.

Next, in an initial status in which the piston 25a of the extrusion cylinder 25 of the blow molding machine 10 is maintained at a predetermined elevated position, the melt liquid crystal resin as a resin material to be molded is supplied from the material supply device 50 into the head main body 21 (extrusion cylinder 25) of the accumulator head 20. Then, when this liquid crystal resin composition is supplied in the predetermined amount, the driving device 26 is operated to lower the piston 25a of the extrusion cylinder 25. Therefore, the liquid crystal resin composition filled in the extrusion cylinder 25 is sent through the circular gap formed between the core 23 and the die 24 to extrude the composition through the extrusion opening 21a and the cylindrical parison P is formed (parison forming step).

When the cylindrical parison P is extruded through the extrusion opening 21a, the extraction amount of the liquid crystal resin composition is set to be equal to or higher than 0.3 kg and lower than 5 kg per minute (the extrusion speed is equal to or higher than 0.3 kg/minute and lower than 5 kg/minute), preferably equal to or higher than 2.0 kg and lower than 5 kg per minute. Alternatively, the shear rate of the liquid crystal resin composition at the extrusion opening 21a is set to be equal to or higher than 50/second and lower than 1000/second, preferably equal to or higher than 300/second and lower than 1000/second. When the extrusion speed of the liquid crystal resin composition is lower than 0.3 kg/minute or a shear rate is lower than 50/second, the parison P is cooled and the adhesiveness of the pinch-off section is deteriorated in a blow molding step (which will be described after). Therefore, a preferable molded product cannot be obtained. On the other hand, when the extrusion speed of the liquid crystal resin composition is equal to or higher than 5 kg/minute or the shear rate is equal to or higher than 1000/second, the erecting property of the parison P is deteriorated. It is difficult to obtain the molded products having a uniform thickness and the tensile breaking elongation of the parison P in the direction perpendicular to the longitudinal axis direction is deteriorated. Therefore, a preferable molded product cannot be obtained.

Even though a die for extruding a parison has any structure, it is possible to form a molded product. However, the die having a structure for suppressing a spider mark or a weld line is preferred because molded products having high uniform thickness property are easily obtained. Generally, a die head has a cross head die structure because the die head vertically changes the flow of resin outputted through a horizontal extruder. A cross head die is classified into the center inflow type cross head and the side inflow type cross head. In the center inflow type cross head, because a spider for retaining a mandrel is provided, it is difficult to eliminate a spider mark. On the other hand, in the side inflow type cross head, there is no spider. However, a weld line is caused at a part at which the resin flows collectively. Because the weld line can be less conspicuous by providing a spiral flow path in the mandrel of the side inflow type die, this structure is preferable. When an accumulator is used, the above die is directly used in case of a side accumulator. Thus, a spiral mandrel is suitable for the molding of the pressure-resistant container liner of the present invention. The weld line also can be less conspicuous by using an accumulator in a die (ring piston type accumulator) as shown in FIG. 1.

Next, as shown in FIG. 1, the molds 30 are closed by driving the open/close driving device in a state that the parison P is disposed between the left and right molds 30 (mold closing step). In this embodiment, a ratio of the diameter of the parison P formed by the parison forming step to the diameter of the cavity C (see FIG. 2) formed with the left and right molding faces 31 by closing the mold 30 (blow ratio) is set to 1.2 to 5.0. By setting the blow ratio within such a range, the anisotropic characteristics in the longitudinal axis direction of the parison P and the anisotropic characteristics in a direction perpendicular to this longitudinal axis direction can be further improved.

The blow ratio which is lower than 1.2 is not preferred because the parison P is little elongated in a direction perpendicular to the longitudinal axis direction and the parison P easily deforms. On the other hand, when the blow ratio exceeds 5.0, the parison P is significantly elongated in a direction perpendicular to the longitudinal axis direction of the parison P and the tensile breakage strength of the parison P is increased. However, because the tensile breaking elongation becomes small and the parison P easily breaks when the pressure in the liner increases, the above blow ratio is not preferred. The blow ratio which is set to the range of 1.4 to 3.0 is preferable because the anisotropic characteristics can be further improved.

In this embodiment, the mold 30 is heated by the heaters in the mold closing step in a temperature range from 40 to 150° C. By heating the mold 30 in the mold closing within the above temperature range, the adhesiveness of the pinch-off section Po (see FIG. 2) of the parison P can be improved. The temperature of the mold 30 which is lower than 40° C. is not preferred because the parison P is cooled when the parison is in contact with the mold 30 and the adhesive strength of the pinch-off section Po is decreased. On the other hand, when the temperature of the mold 30 exceeds 150° C., the cooling speed of the parison P is slow and the parison P is thinly elongated by blowup. Therefore, the strength of the pinch-off section Po is decreased and the above temperature is not preferred.

As the shape of the pinch section of the mold 30, the two-stage pinch section 32 as in this embodiment (see FIG. 2) is more preferable than a general one-stage pinch section because it is possible to increase the thickness of the pinch-off section Po of the parison P. The reason is that a space formed by the two-stage pinch section 32 functions as a "resin storage" to prevent resin from flowing from the pinch-off section Po of the parison P to the outside. For example, the thickness of the pinch-off section Po of 2 mm or more (more preferably 3 mm or more) is preferable because the adhesiveness of the pinch-off section Po is increased and the high tensile breaking elongation is obtained.

When the thickness of the pinch-off section Po is increased, a mold closing pressure is small and the adhesive force for adhering the parisons P is weak. Thus, the tensile breakage strength and the tensile breaking elongation of the pinch-off section Po are reduced. Therefore, it is important to set the mold closing pressure to an appropriate value depending on the thickness of the pinch-off section Po. Specifically, a value obtained by dividing the mold closing pressure by the thickness of the pinch-off section Po is suitably set to be equal to or higher than 3.5 MPa/cm and more preferably equal to or higher than 4.0 MPa/cm.

Next, by blowing compressed air from a blow pin (not shown) into the parison P, the parison P is pressed to the molding face 31 of the mold 30 and is cooled to mold a pressure-resistant container liner as a molded product (blow molding step). Compressed air is preferably blown at the timing at which 0.5 to 1.5 seconds elapse since the mold is closed. Thereafter, when the mold 30 is cooled to a predetermined temperature, the mold 30 is opened by driving the open/close driving device to take a molded product (pressure-resistant container liner). Then, the producing of the liner is finished.

EXAMPLE

Next, the present invention will be described in further detail by examples. In these examples, two types of whole aromatic liquid crystal resins are produced and each of these two types of liquid crystal resins is mixed with epoxy modified polystyrene resin to prepare various resin composition pellets. Then, these resin composition pellets are heated and melted at various temperatures to carry out the blow molding. Then, the properties of the obtained blow-molded products are evaluated.

The property evaluation process which is carried out in these examples, is as follows.

(1) Melting point of liquid crystal resin: Based on JIS K7121, the obtained liquid crystal resin pellets were measured at the temperature increase rate of 20° C./minute by the differential thermal analysis (DSC).

(2) Melt viscosity: By a capillary leometer (Capirograph 1B made by Toyo Seiki Co., Ltd. and having a barrel diameter of 10 mm), apparent melt viscosities were measured at a shear rate of 1000/second based on ISO11443. In the measurement, an orifice having an inner diameter of 1.0 mm and a length of 20 mm was used. (3) Melt tension: In the above capillary leometer, the tensions (mN) applied to fibers of the melt polymer when the melt polymer discharged from the orifice was taken over in a fibrous manner at take-over speeds of 15 m/minute and 30 m/minute, were measured under the conditions of the temperature T1 (resin melting point +20° C.) and a piston extrusion speed of 10 mm/minute by the orifice having an inner diameter of 1.0 mm and a length of 20 mm.

(4) Appearance of molded product (breakage of molded product): By a blow molding machine (S-45ND made by Placo Co., Ltd.), cylindrical blow-molded products having a diameter of 120 mm and a length of 280 mm were prepared at the molding temperatures shown in Tables 3 and 4. Then, it was visually evaluated whether the molded products were broken or not after the blow process.

(5) Tensile breaking elongation: From a trunk section of the blow-molded product, a test piece was cut out in a dumbbell piece shape based on ASTM D638 type 5 and the tensile breaking elongations were measured in the parison longitudinal axis direction (hereinafter referred to as "vertical direction") and in a direction perpendicular to this parison longitudinal axis direction (hereinafter referred to as "horizontal direction") by using Tensilon RTC-1325A made by ORIENTEC Co., LTD.

(6) Pinch-off section tensile breaking elongation: In order to measure the tensile breaking elongation of a cutting line at the pinch-off section of the blow-molded product, the test piece was cut out in a dumbbell piece shape based on ASTM D638 type 5 in a direction perpendicular to the cutting line. Then, the tensile breaking elongation of the pinch-off section was measured by Tensilon RTC-1325A made by ORIENTEC Co., LTD.

(7) Thickness of pinch-off section: the thickness of the cutting line portion of the test piece which was used for the measurement of the tensile breaking elongation of the pinch-off section was measured.

(8) Uniform thickness property of molded product: A middle part of the trunk section of the molded product in the up-and-down direction was cut out in a stripe-like shape. Then, the maximum and minimum values of the thickness were measured and the ratio between the maximum and minimum values was used as an evaluation value of the uniform thickness property.

First, the produce examples of two types of whole aromatic liquid crystal resins (which will be called as LCP A-1 and LCP A-2) will be explained.

Produce Example 1

Produce of LCP A-1

173 weight parts of P-hydroxy benzoic acid (I), 38 weight parts of 6-hydroxy-2-naphthoic acid (II), 52 weight parts of 4,4'-dihydroxy biphenyl (III), 65 weight parts of terephthalic acid (IV), 17 weight parts of 4-acetaminophenol (V), 0.04 weight part of potassium acetate, and 221 weight parts of acetic anhydride were respectively put into reactors including agitators and distillation tubes. After the nitrogen substitution was sufficiently carried out, the temperature was increased to 150° C. under normal pressures and the agitation was started. The agitation was carried out at 150° C. for 30 minutes. Then, the temperature was gradually increased to distil away acetic acid as by-product material. When the temperature reached 340° C., the pressure in the reactor was gradually decreased and the agitation was carried out under a pressure of 5 torr for one hour. When a target agitation torque was reached, a discharge opening of the lower part of the reactor was opened and the resin was taken out in a strand shape by nitrogen pressure. The discharged strands were processed by a pelletizer to obtain pellets. The melting point of this whole aromatic polyester amide (LCP A-1) was 300° C. and the melt viscosity was 36.8 Pa·s at 320° C.

Produce Example 2

Produce of LCP A-2

345 weight parts of P-hydroxy benzoic acid, 175 weight parts of 6-hydroxy-2-naphthoic acid (II), 0.02 weight part of potassium acetate and 350 weight parts of acetic anhydride were respectively put into reactors including agitators and distillation tubes. After the nitrogen substitution was sufficiently carried out, the temperature was increased to 150° C. under normal pressures and the agitation was started. The agitation was carried out at 150° C. for 30 minutes. Then, the temperature was gradually increased to distil away acetic acid as by-product material. When the temperature reached 300° C., the pressure in the reactor was gradually decreased and the agitation was carried out under a pressure of 5 torr for one hour. When a target agitation torque was reached, a discharge opening of the lower part of the reactor was opened and the resin was taken out in a strand shape by nitrogen pressure. The discharged strands were processed by a pelletizer to obtain pellets. The melting point of this whole aromatic liquid crystal polyester (LCP A-2) was 280° C. and the melt viscosity was 50.1 Pa·s at 300° C.

Compositions of these LCP A-1 and A-2 are shown in Table 1. Both of LCP A-1 and A-2 showed an optically anisotropic characteristics in a melt status.

TABLE 1

| | | Ratio of repeating polymerization units (mol %) | | | | |
|---|---|---|---|---|---|---|
| Example | LCP | I | II | III | IV | V |
| Manufacture example 1 | A-1 | 56 | 9 | 12.5 | 17.5 | 5 |
| Manufacture example 2 | A-2 | 73 | 27 | — | — | — |

Next, LCP A-1 and A-2 produced as described above were dry-blended with epoxy modified polystyrene shown in Table 2. Then, by using a twin-screw extruder (Tex30α made by Japan Steel Works, Ltd.), the resins were melt and kneaded at a cylinder temperature (320° C. for LCP A-1 and 300° C. for LCP A-2), a throughput rate of 30 kg/hr, and a screw rotation rate of 200 rpm to provide pellets. Then, "examples 1 to 9" and "comparison examples 1 to 8" were prepared by blow molding under conditions shown in Tables 3 and 4.

The used (B) components are shown in Table 2. Incidentally, the epoxy equivalents of the (B) components are values measured by the perchloric acid process based on the JIS K7236 process, and the weight-average molecular weights are values measured by the gel permeation chromatography using chloroform as a solvent and converted by polystyrene.

B-1: Marproof G-1010S made by Nippon Oil & Fats Co., Ltd. (epoxy modified styrene series copolymer, epoxy equivalent of 1700 g/eq, weight-average molecular weight of 100000)

B'-1 (comparison product): Marproof G-1005S made by Nippon Oil & Fats Co., Ltd. (epoxy modified styrene series copolymer, epoxy equivalent of 3300 g/eq, weight-average molecular weight of 100000) B'-2 (comparison product): Marproof G-0130S made by Nippon Oil & Fats Co., Ltd. (epoxy modified styrene series copolymer, epoxy equivalent of 530 g/eq, weight-average molecular weight of 9000)

The obtained liquid crystal resin pellets and blow-molded products were evaluated with regards to the properties of the above items (1) to (8). The evaluation results are shown in Tables 3 and 4.

TABLE 2

| Epoxy modified polystyren | Brand name | Item number | Epoxy equivalent(g/eq) | Weight-average molecular weight |
|---|---|---|---|---|
| B-1 | Marproof | G-1010S | 1700 | 100,000 |
| B'-1 | Marproof | G-1005S | 3300 | 100,000 |
| B'-2 | Marproof | G-0130S | 530 | 9,000 |

TABLE 3

| | | | Examples | | | | | | | | |
|---|---|---|---|---|---|---|---|---|---|---|---|
| | | | Ex. 1 | Ex. 2 | Ex. 3 | Ex. 4 | Ex. 5 | Ex. 6 | Ex. 7 | Ex. 8 | Ex. 9 |
| Component | LCP | A-1 | | | | | | | | | 90 |
| | | A-2 | 90 | 87.5 | 87.5 | 87.5 | 87.5 | 87.5 | 87.5 | 85 | |
| | Polystyrene resin B | B-1 | 10 | 12.5 | 12.5 | 12.5 | 12.5 | 12.5 | 12.5 | 15 | 10 |
| | | B'-1 | | | | | | | | | |
| | | B'-2 | | | | | | | | | |

TABLE 3-continued

| | | | Examples | | | | | | | | |
|---|---|---|---|---|---|---|---|---|---|---|---|
| | | | Ex. 1 | Ex. 2 | Ex. 3 | Ex. 4 | Ex. 5 | Ex. 6 | Ex. 7 | Ex. 8 | Ex. 9 |
| Manufactured resin | Melting point | °C. | 280 | 280 | 280 | 280 | 280 | 280 | 280 | 280 | 300 |
| | Melt viscosity | Pa·s | 182.7 | 288.3 | 288.3 | 288.3 | 288.3 | 288.3 | 288.3 | 313.6 | 173.0 |
| | Melt tension at 15 m/minute | mN | 85.9 | 128.9 | 128.9 | 128.9 | 128.9 | 128.9 | 128.9 | 143.2 | 78.0 |
| | Melt tension at 30 m/minute | mN | 97.1 | 145.7 | 145.7 | 145.7 | 145.7 | 145.7 | 145.7 | 164.7 | 88.3 |
| | Increase rate of melt tension | | 1.13 | 1.13 | 1.13 | 1.13 | 1.13 | 1.13 | 1.13 | 1.15 | 1.13 |
| Blow molding | Temperature | °C. | 300 | 300 | 300 | 300 | 300 | 300 | 300 | 300 | 310 |
| | Blow ratio | | 1.8 | 1.8 | 1.8 | 1.8 | 1.8 | 1.6 | 2.0 | 1.8 | 1.8 |
| | Mold temperature | °C. | 100 | 100 | 100 | 100 | 100 | 100 | 100 | 100 | 100 |
| | Die/mandrel shape | | Crosshead/spiral | ← | ← | Spider type | Crosshead/spiral | ← | ← | ← | ← |
| | Pinch section shape | | 2-stage | 2-stage | 2-stage | 2-stage | 2-stage | 2-stage | 1-stage | 2-stage | 2-stage |
| | mold closing pressure | kgf/cm² | 19 | 19 | 19 | 19 | 11 | 19 | 19 | 11 | 19 |
| | Extrusion speed | kg/min | 3 | 3 | 1.8 | 1.8 | 3 | 1.8 | 3 | 3 | 3 |
| | Shear rate | sec⁻¹ | 400 | 400 | 240 | 240 | 400 | 240 | 400 | 400 | 400 |
| | Breakage of molded product | | No | No | No | No | No | No | No | No | No |
| Tensile test | Elongation in vertical direction (MD) | % | 9.2 | 11.2 | 10.8 | 11.2 | 10.9 | 11.9 | 9.8 | 8.7 | 11.5 |
| | Elongation in horizontal direction (TD) | % | 8.8 | 9.8 | 9.4 | 9.8 | 9.4 | 11.4 | 9.6 | 7.9 | 10.1 |
| | MD/TD | | 1.05 | 1.14 | 1.15 | 1.14 | 1.16 | 1.04 | 1.02 | 1.10 | 1.14 |
| Thickness of pinch-off section | | mm | 3.2 | 3.3 | 3.1 | 3.2 | 2.8 | 2.9 | 2.8 | 2.7 | 3.3 |
| Tensile breaking elongation of pinch-off section | | % | 11.0 | 12.6 | 11.5 | 12.2 | 11.1 | 12.8 | 8.9 | 8.8 | 11.8 |
| Thickness of pinch-off section at mold closing pressure | | MPa/cm | 5.8 | 5.6 | 6.0 | 5.8 | 3.9 | 6.4 | 6.7 | 4.0 | 5.6 |
| Minimum value of trunk section of molded product | | mm | 1.0 | 1.1 | 1.1 | 1.1 | 1.0 | 0.9 | 0.9 | 0.9 | 1.1 |
| Maximum value of trunk section of molded product | | mm | 1.2 | 1.3 | 1.2 | 1.3 | 1.2 | 1.1 | 1.3 | 1.2 | 1.3 |
| Uniform thickness property of molded products | | | 1.2 | 1.2 | 1.1 | 1.2 | 1.2 | 1.2 | 1.4 | 1.3 | 1.2 |

TABLE 4

| | | | Examples | | | |
|---|---|---|---|---|---|---|
| | | | Comparison Example 1 | Comparison Example 2 | Comparison Example 3 | Comparison Example 4 |
| Component | LCP | A-1 | | | 87.5 | 95 |
| | | A-2 | 90 | 90 | | |
| | Polystyrene resin B | B-1 | | | 12.5 | 5 |
| | | B'-1 | 10 | | | |
| | | B'-2 | | 10 | | |
| Manufactured resin | Melting point | °C. | 300 | 300 | 280 | 280 |
| | Melt viscosity | Pa·s | 153.6 | 218.8 | 288.3 | 102.2 |
| | Melt tension at 15 m/minute | mN | 63.1 | 89.9 | 128.9 | 28.9 |
| | Melt tension at 30 m/minute | mN | 63.7 | 91.7 | 145.7 | 28.9 |
| | Increase rate of melt tension | | 1.01 | 1.02 | 1.13 | 1.00 |
| Blow molding | Temperature | °C. | 300 | 300 | 300 | 300 |
| | Blow ratio | | 1.8 | 1.8 | 1.8 | 1.8 |
| | Mold temperature | °C. | 100 | 100 | 100 | 100 |
| | Die/mandrel shape | | Crosshead/spiral | ← | ← | ← |
| | Pinch section shape | | 2-stage | 2-stage | 2-stage | 2-stage |
| | mold closing pressure | kgf/cm² | 19 | 19 | 8 | 19 |
| | Extrusion speed | kg/min | 3 | 3 | 0.15 | 9 |

TABLE 4-continued

|  |  |  |  |  |  |  |
|---|---|---|---|---|---|---|
|  | Shear rate | sec⁻¹ | 400 | 400 | 30 | 1200 |
|  | Breakage of molded product |  | Broken | Broken | No | Partially broken |
| Tensile test | Elongation in vertical direction (MD) | % |  |  | 13.1 | 1.9 |
|  | Elongation in horizontal direction (TD) | % |  |  | 9.9 | 3.2 |
|  | MD/TD |  |  |  | 1.3 | 0.6 |
| Thickness of pinch-off section |  | mm |  |  | 4.8 | 2.7 |
| Tensile breaking elongation of pinch-off section |  | % |  |  | 1.6 | 2.3 |
| Thickness of pinch-off section at mold closing pressure |  | MPa/cm |  |  | 1.6 | 6.9 |
| Minimum value of trunk section of molded product |  | mm |  |  | 1.1 | 0.2 |
| Maximum value of trunk section of molded product |  | mm |  |  | 1.3 | 1.5 |
| Uniform thickness property of molded products |  |  |  |  | 1.2 | 7.5 |

|  |  |  | Examples |  |  |  |
|---|---|---|---|---|---|---|
|  |  |  | Comparison Example 5 | Comparison Example 6 | Comparison Example 7 | Comparison Example 8 |
| Component | LCP | A-1 |  |  |  |  |
|  |  | A-2 | 70 | 100 | 95 | 90 |
|  | Polystyrene resin B | B-1 | 30 |  | 5 | 10 |
|  |  | B'-1 |  |  |  |  |
|  |  | B'-2 |  |  |  |  |
| Manufactured resin | Melting point | °C. | 280 | 280 | 280 | 280 |
|  | Melt viscosity | Pa·s | 1884.0 | 42.0 | 102.2 | 182.7 |
|  | Melt tension at 15 m/minute | mN | 303.1 | Unmeasurable | 28.9 | 85.9 |
|  | Melt tension at 30 m/minute | mN | 296.3 |  | 28.9 | 97.1 |
|  | Increase rate of melt tension |  | 0.98 |  | 1.00 | 1.13 |
| Blow molding | Temperature | °C. | 310 | 290 | 300 | 300 |
|  | Blow ratio |  | 1.8 | Draw down | 1.8 | 1.8 |
|  | Mold temperature | °C. | 100 | Unmoldable | 100 | 100 |
|  | Die/mandrel shape | Crosshead/spiral | ← |  | ← | ← |
|  | Pinch section shape |  | 2-stage |  | 2-stage | 2-stage |
|  | mold closing pressure | kgf/cm² | 19 |  | 19 | 19 |
|  | Extrusion speed | kg/min | 3 |  | 3 | 9 |
|  | Shear rate | sec⁻¹ | 400 |  | 400 | 1200 |
|  | Breakage of molded product |  | Broken |  | No | Partially broken |
| Tensile test | Elongation in vertical direction (MD) | % |  |  | 4.3 | 1.9 |
|  | Elongation in horizontal direction (TD) | % |  |  | 7.5 | 3.5 |
|  | MD/TD |  |  |  | 0.6 | 0.54 |
| Thickness of pinch-off section |  | mm |  |  | 3.0 | 2.8 |
| Tensile breaking elongation of pinch-off section |  | % |  |  | 8.0 | 5.0 |
| Thickness of pinch-off section at mold closing pressure |  | MPa/cm |  |  | 6.3 | 6.7 |
| Minimum value of trunk section of molded product |  | mm |  |  | 0.2 | 0.2 |
| Maximum value of trunk section of molded product |  | mm |  |  | 1.5 | 1.8 |
| Uniform thickness property of molded products |  |  |  |  | 7.5 | 9.0 |

Examples 1 to 9

The pellets obtained by the examples 1 to 9 showed a melt tension increase rate of 1.05 times or more, which was suitable for a blow molding process.

As shown in Table 3, the blow-molded products obtained by the examples 1 to 9 showed that the tensile breaking elongations of the trunk sections in the vertical direction and the horizontal direction significantly were higher than a criterion of "2% or more". In the examples 6 and 9, both of the tensile breaking elongations in the vertical direction and the horizontal direction exceeded 10%.

Comparison Examples 1 to 8

The pellet obtained by the comparison example 1 used the modified polystyrene having the little contained amount of epoxy group. Consequently, the melt viscosity and the melt tension thereof were slightly lower than those of the examples, and also the melt tension increase rate thereof was less than 1.05 times to make the blow molding impossible.

The pellet obtained by the comparison example 2 used the modified polystyrene having a small weight-average molecular weight. Consequently, the melt tension increase rate was also less than 1.05 times, which made the blow molding impossible.

The comparison example 3 tried the blow molding under conditions of a small melt resin extrusion shear rate at the parison forming step, and it took a long time to form the parison. Consequently, the pinch melting portion was cooled to exert a harmful influence. Therefore, the tensile breaking elongation of the pinch-off section decreased, and the properties required for a pressure-resistant container liner was not satisfied.

The comparison example 4 set the modified polystyrene addition quantity to be little, and the extrusion shear rate to be large. Thereby, the drawdown of the parison was remarkable to make the blow molding difficult. Furthermore, the tensile breaking elongation of the parison in the direction perpendicular to the longitudinal axis direction thereof decreased, and also the uniform thickness property of the molded product was deteriorated. Consequently, the comparison example 4 did not satisfy the properties required for the pressure-resistant container liner.

Moreover, some molded products caused breakages.

The comparison example 5 used too much additive amount of epoxy modified polystyrene, and the melt stretchability at the time of blowup was insufficient to cause an explosion.

The comparison example 6 showed remarkable drawdown because only the liquid crystal resin was included, and it was impossible to perform molding.

The comparison example 7 included a small modified polystyrene addition quantity, and the drawdown of the parison was remarkable, which made it difficult to perform blow molding and made the uniform thickness property of the molded product inferior. Then, the comparison example 7 did not satisfy the properties required for a pressure-resistant container liner.

The comparison example 8 set the extrusion shear rate to be large, which decreased the tensile braking elongation of the parison in the direction perpendicular to the longitudinal axis direction thereof and also made the uniform thickness property of the molded product inferior. Then, the comparison example 8 did not satisfy the properties required for a pressure-resistant container liner.

Moreover, some molded products caused breakages.

In the produce processes according to the embodiments as described above, the liquid crystal polyester and/or the liquid crystal polyester amide are mixed with the epoxy modified polystyrene resin to generate a liquid crystal resin composition having a specific melt property by melting and kneading them. The liquid crystal resin composition is heated and melted at a specific temperature and a cylindrical parison is extruded at a specific extrusion speed and a shear rate to perform a blow molding. Thus, it can be achieved that the tensile breaking elongation is "2% or more" in the vertical direction and in the horizontal direction of the trunk section of the blow-molded product (liner) and it can be achieved that the tensile breaking elongation is "1% or more" in the pinch-off section (examples 1 to 9: See Tables 3 and 4). Furthermore, by using the property of the liquid crystal resin, a liner having a superior gas barrier property can be obtained.

Furthermore, in the produce process according to the above-described embodiment, the resin composition has the melt tension at a twice take-over speed (30 m/minute), which is 1.05 or more times larger than the melt tension at a take-over speed of 15 m/minute. Thus, high-quality liners in which the blow molding can be easily carried out can be produced at a high yield.

Furthermore, in the produce process according to the above-described embodiment, a ratio of the outer diameter of the parison formed in the parison forming step to the diameter of a cavity formed by a mold (blow ratio) is set to a specific ratio (1.2 to 5.0). Thus, the anisotropic characteristics of the liquid crystal resin can be improved and the tensile breaking elongations in both of the vertical direction and the horizontal direction of the trunk section of the blow-molded product (liner) can be improved (the examples 1 to 9: see Tables 3 and 4).

Furthermore, in the produce process according to the above-described embodiment, when the mold closing step is performed, the mold is heated in a specific temperature range (40° C. to 150° C.). Thus, the adhesiveness of the liquid crystal resin at the pinch-off section of the blow-molded product (liner) can be improved. Further, the tensile breaking elongation of the pinch-off section can be improved (examples 1 to 9: see Tables 3 and 4).

Furthermore, in the produce process according to the above-described embodiment, when the mold closing step is performed, the value obtained by dividing the mold closing pressure by the thickness of the pinch-off section is equal to or higher than a specific threshold value (3.5 MPa/cm). Thus, the adhesiveness of the liquid crystal resin at the pinch-off section can be improved. Further, the tensile breaking elongation of the pinch-off section can be improved (examples 1 to 9: see Tables 3 and 4).

Furthermore, in the produce process according to the above-described embodiment, two-stage pinch sections are provided in the molds and a space is formed between the two-stage pinch sections when the molds are closed in the mold closing step. Thus, when the parison is cut off in the mold closing step, the liquid crystal resin can be stored in the space formed between the two-stage pinch sections. Therefore, when the mold closing is carried out, it can be prevented that the liquid crystal resin flows out of the pinch-off section of the blow-molded product (liner) to the outside of the mold. Consequently, it can be prevented that the pinch-off section is thinner. As a result, it is possible to increase the adhesiveness of the pinch-off section and to improve the tensile breaking elongation of the pinch-off section (examples 1 to 9: see Tables 3 and 4).

Furthermore, in the blow-molded product (liner made of liquid crystal resin) produced by the examples 1 to 9, the tensile breaking elongation of the trunk section is "2% or more" and the tensile breaking elongation of the pinch-off section is "1% or more". Thus, the properties required for the trunk section and the pinch-off section of the pressure-resistant container liner are satisfied. Because of the property of the liquid crystal resin, the superior gas barrier property is obtained. Thus, the liner made of liquid crystal resin can be suitably used as a pressure-resistant container liner instead of a high density polyethylene liner.

In the blow-molded product (liner made of liquid crystal resin) produced by the examples 1 to 9 of the embodiment as described above, the pinch-off section has a thickness of the specific threshold value (2 mm) or more. Thus, the adhesiveness of the pinch-off section is increased and the liner has a high tensile breaking elongation.

The entire disclosure of Japanese Patent Application No. 2006-020748, filed on Jan. 30, 2006, is incorporated herein by reference in their entirety.

INDUSTRIAL APPLICABILITY

The produce process of the present invention is useful for producing a pressure-resistant container liner effectively using a superior gas barrier property of the liquid crystal resin by a blow molding. The obtained liner made of liquid crystal resin can be used for the liner of a fuel tank or the like of an automobile and a spacecraft, which is required to have light weight.

EXPLANATION OF REFERENCE NUMERALS

30 mold
32 two-stage pinch section
32c space
C cavity
P parison
Po pinch-off section

The invention claimed is:
1. A method for manufacturing a pressure-resistant container liner by a blow molding, comprising:
a resin composition melting step of heating a blow molding liquid crystal resin composition within a temperature range from a melting point to the melting point +40° C. to melt the resin composition, the resin composition being produced by blending, melting and kneading (A) 100 weight parts of liquid crystal polyester and/or liquid crystal polyester amide, (B) 10 to 25 weight parts of styrene series copolymer comprising 40 to 97% by weight of one or more kinds of styrenes, 60 to 3% by weight of glycidylester of an α, β-unsaturated acid expressed by a following general formula (1), and 0 to 50% by weight of another vinyl monomer, the styrene series copolymer having an epoxy equivalent of 1700 to 3000 g/eq and a weight average molecular weight of 30000 or more,

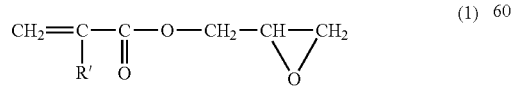
(1)

where —R' denotes hydrogen or an alkyl group, and (C) 0 to 100 weight parts of one or more kinds of fibrous, particulate, and plate-like fillers, the resin composition having a melt viscosity of 60 to 4000 Pa·s at a temperature higher than the melting point by 20° C. at a shear rate of 1000/sec and a melt tension of 20 mN or more at a take-over speed of 15 m/min;
a parison forming step of extruding and forming a cylindrical parison with an extrusion speed equal to or higher than 0.3 kg/minute and lower than 5 kg/minute by using the specific resin composition melt in the resin composition melting step;
a mold closing step of placing the parison formed in the parison forming step between a pair of molds forming a cylindrical cavity and of closing the molds; and
a forming step of blowing gas into the parison in the molds closed in the mold closing step to form a liner, wherein:
the resin composition in which an increase rate of a melt tension at a twice take-over speed (30 m/minute) to the melt tension at the take-over speed of 15 m/minute is 1.05 or more, is used.

2. A method for manufacturing a pressure-resistant container liner by a blow molding, comprising:
a resin composition melting step of heating a blow molding liquid crystal resin composition within a temperature range from a melting point to the melting point +40° C. to melt the resin composition, the resin composition being produced by blending, melting and kneading (A) 100 weight parts of liquid crystal polyester and/or liquid crystal polyester amide, (B) 10 to 25 weight parts of styrene series copolymer comprising 40 to 97% by weight of one or more kinds of styrenes, 60 to 3% by weight of glycidylester of an α, β-unsaturated acid expressed by a following general formula (1), and 0 to 50% by weight of another vinyl monomer, the styrene series copolymer having an epoxy equivalent of 1700 to 3000 g/eq and a weight average molecular weight of 30000 or more,

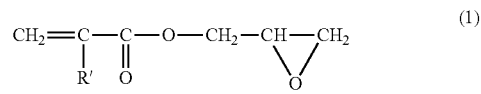
(1)

where —R' denotes hydrogen or an alkyl group, and (C) 0 to 100 weight parts of one or more kinds of fibrous, particulate, and plate-like fillers, the resin composition having a melt viscosity of 60 to 4000 Pa·s at a temperature higher than the melting point by 20° C. at a shear rate of 1000/sec and a melt tension of 20 mN or more at a take-over speed of 15 m/min;
a parison forming step of extruding and forming a cylindrical parison with a shear rate equal to or higher than 50/second and lower than 1000/second by using the specific resin composition melt in the resin composition melting step;
a mold closing step of placing the parison formed in the parison forming step between a pair of molds forming a cylindrical cavity and of closing the molds; and
a forming step of blowing gas into the parison in the molds closed in the mold closing step to form a liner, wherein:
the resin composition in which an increase rate of a melt tension at a twice take-over speed (30 m/minute) to the melt tension at the take-over speed of 15 m/minute is 1.05 or more, is used.

3. The method for manufacturing the pressure-resistant container liner as claimed in claim 1 or 2, wherein:
when the mold closing step is performed, a value obtained by dividing a mold closing pressure by a thickness of a pinch-off section is of 3.5 MPa/cm or more.

4. The method for manufacturing the pressure-resistant container liner as claimed in claim 1 or 2, wherein:
  two-stage pinch sections are provided in the molds and a space is formed between the two-stage pinch sections when the molds are closed in the mold closing step.

5. A liquid crystal resin liner manufactured by the method for manufacturing the pressure-resistant container liner as claimed in claim 1 or 2, wherein a tensile breaking elongation in all directions of a trunk section is 2% or more and a tensile breaking elongation in a pinch-off section is 1% or more.

6. The liquid crystal resin liner as claimed in claim 5, wherein:
  the pinch-off section has a thickness of 2 mm or more.

* * * * *